March 13, 1928.
C. C. GATES
1,662,262
ANTISKID DEVICE
Filed Aug. 5, 1927
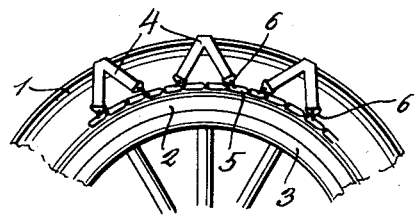
Fig. 1.
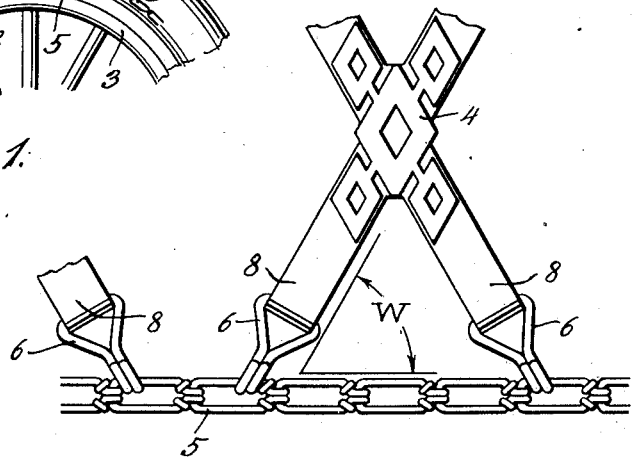
Fig. 2.
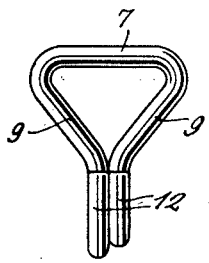
Fig. 3.
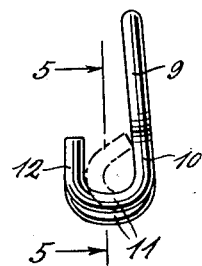
Fig. 4.
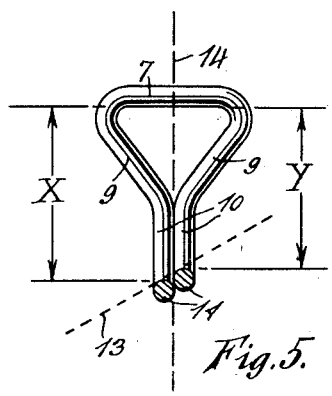
Fig. 5.
Inventor
Charles C. Gates.
By 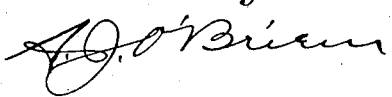
Attorney Patented Mar. 13, 1928.

1,662,262

UNITED STATES PATENT OFFICE.

CHARLES C. GATES, OF DENVER, COLORADO.

ANTISKID DEVICE.

Application filed August 5, 1927. Serial No. 210,875.

This invention relates to improvements in hooks for attaching antiskid devices to the side chains used in connection therewith.

It is becoming increasingly customary to employ antiskid devices consisting of cruciform sections formed of rubber composition which replace the transverse chains of the ordinary antiskid chains. These sections have their ends supplied with eyelets for the reception of a hook by means of which they are attached to the side chains. As these antiskid devices are formed with four arms forming two lined pairs which have the appearance of the capital letter X, it is apparent that when they are attached to the side chains, they will extend at an angle to the latter and therefore if the hooks by means of which they are attached to the chain are not specially constructed to make them suitable for use in this particular relationship, they will only have bearing at one point on the chain link and therefore the wear will be excessive.

It is the object of this invention to so modify the hooks by means of which these antiskid devices are attached that a greater bearing surface will be obtained so as to assure longer life for the side chains.

The above and other objects that may become apparent as the description proceeds are attained by means of a construction which will be described in detail and reference for this purpose will now be had to the accompanying drawing in which the invention has been illustrated and in which:

Fig. 1 is a side elevation of a portion of an automobile wheel showing two sections of antiskid devices in place thereon;

Fig. 2 is a view to a larger scale showing a section of the side chain and illustrating the manner of attaching the antiskid devices thereto;

Fig. 3 is a plan view of one of the improved hooks;

Fig. 4 is a side elevation of the hook shown in Fig. 3; and

Fig. 5 is a section taken on line 5—5, Fig. 4.

In the drawing numeral 1 represents the ordinary tire casing; 2 the demountable rim and 3 the ordinary fellow of the wheel the automobile wheel. Secured to this tire has been shown two sections 4 of antiskid devices whose ends are attached to the side chain 5 by means of hooks 6. Since the chain extends around the automobile tire in the form of a circle and since the antiskid devices are cruciform, it is evident that the force exerted by these antiskid devices will be applied to the chain in a direction that makes a considerable angle with the same. The links which are formed substantially as shown in Fig. 2, have their sides extending practically perpendicular to a radius of the wheel and therefore, it is clearly apparent that the force exerted by the antiskid device will tend to slide the hook to one end of the link as shown in Fig. 2.

These antiskid devices are attached to the chain by means of hooks 6 and these hooks are ordinarily formed from a piece of round steel bar of the proper diameter which has a straight portion 7 that extends through an eyelet in the end of each of the arms 8, there being four of these hooks to each antiskid device. The ends of the straight portion 7 are bent inwardly so as to form inclined sides 9 which terminate in straight sections 10 that are adjacent to and parallel with each other, all in the manner shown in Figs. 3 and 5. The straight sections 10 are bent upwardly in the manner indicated at 11 and then rearwardly in the manner indicated at 12, thus forming a hook which is adapted to embrace one side of a link in the manner shown in Fig. 2. After this hook has been put in place about the link, the ends 12 are bent inwardly so as to substantially enclose the link and to prevent then from falling off.

Hooks of the type just described have been used in connection with nonskid devices but the sections 10 have been of the same length so that the upwardly extending ends 11 have been the same distance from the transverse member 7. When such hooks are used in an assembly like that shown in Fig. 2, it is obvious that only one of the parts 11 will come into contact with the side of the chain and that therefore there will be a very small bearing surface, which will cause the chain and the part of the hook that contacts with it to wear very fast. This excessive wear soon causes the chain link to become so weak that it breaks and when this occurs it results in either losing the chain or in being the cause of some serious accident.

I have found that by making the distance from one of the upright members 11 to the transverse member 7 greater than that of the other, that both of these upright members will contact with the side of the chain, even when the force is exerted at an angle in the manner shown. The distances from 11 to 7 which distances have been designated by "X" and "Y" in Fig. 5 are calculated so that the direction of the line 13, Fig. 5, and which represents the direction of the side of one of the links of the chain, will make the same angle with the line 14 which represents the direction of the pull or force as the corresponding angle "W" in Fig. 2. Owing to the fact that Fig. 2 has shown the chain in a straight line, whereas it is curved when it is applied to the wheel, the angle "W" to which reference has been made, is not strictly the same as the corresponding angle when applied to the wheel, but as the exact value of this angle is immaterial it is believed that the explanation is sufficiently accurate for the purpose for which it is intended. When the hooks are constructed in the manner shown in Figs. 3, 4 and 5, it is evident that the surfaces of both uprights 11 will contact with the chain and therefore there will be twice the contact surface that otherwise will be present. After the parts have become slightly worn, the area of the contact surface will increase with the result that the sides of the links will wear very slowly and the life of the chains will therefore be greatly increased. As the side chains are subjected to very little wear, except that caused by the action of the hooks, whereas the antiskid devices are subject to severe wear, it has been found that the side chains will outlast one or more of the antiskid devices, providing the hooks are formed in the manner explained. If the distances "X" and "Y" are equal, the side chains are often worn out before the transverse or antiskid devices. It is therefore evident that my hooks will increase the life of the side chains and obviate the danger of breakage which might otherwise occur after the side chains have been worn due to the faulty construction of the hooks.

From the above it will be apparent that by the simple expedient of making the hooks with the distances "X" "Y" different instead of the same, as has heretofore been the custom, I can greatly increase the length of the life of the side chains and obviate the danger of breakage.

Having described my invention what I claim as new is:

A device of the class described composed of a section of material formed into an eye between its ends, the parts being brought into contact beyond the eye to form a straight shank and bent into a hook beyond the shank, one of the contacting shank parts being longer than the other, so that one side of the hook is offset from the other in the direction of the length of the shank to give the hook parts a potential bearing in lines forming oblique angles with said direction.

In testimony whereof I affix my signature.

CHARLES C. GATES.